United States Patent
Matsunaga (10) Patent No.: US 11,163,061 B2
(45) Date of Patent: Nov. 2, 2021

(54) OBJECT DETECTION APPARATUS AND OBJECT DETECTION METHOD

(71) Applicant: DENSO CORPORATION, Kariya (JP)

(72) Inventor: Shogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 600 days.

(21) Appl. No.: 15/780,533

(22) PCT Filed: Dec. 2, 2016

(86) PCT No.: PCT/JP2016/085931
§ 371 (c)(1),
(2) Date: May 31, 2018

(87) PCT Pub. No.: WO2017/094891
PCT Pub. Date: Jun. 8, 2017

(65) Prior Publication Data
US 2018/0348363 A1    Dec. 6, 2018

(30) Foreign Application Priority Data

Dec. 4, 2015 (JP) .............................. JP2015-237667

(51) Int. Cl.
*G01S 13/931* (2020.01)
*G08G 1/16* (2006.01)
(Continued)

(52) U.S. Cl.
CPC ........... *G01S 13/931* (2013.01); *B60W 30/09* (2013.01); *B60W 30/0953* (2013.01);
(Continued)

(58) Field of Classification Search
None
See application file for complete search history.

(56) References Cited

U.S. PATENT DOCUMENTS

2006/0008120 A1    1/2006  Ohkubo
2007/0046449 A1    3/2007  Koike et al.
(Continued)

FOREIGN PATENT DOCUMENTS

JP    2006-107422    4/2006
JP    2006-292475    10/2006
(Continued)

*Primary Examiner* — Whitney Moore
(74) *Attorney, Agent, or Firm* — Maschoff Brennan (57) ABSTRACT

An object detection apparatus includes a radar apparatus, an image capture device, a radar-detection target position detection section, and an image-detection target position detection section. In the apparatus, it is determined that the radar-detection target and the image-detection target are identical when a positional relationship between the targets corresponds to a predetermined relationship. Mitigation control for mitigating a collision between the own vehicle and an identical target is executed when the radar-detection target and the image-detection target are determined to be identical and the distance between the own vehicle and the identical target is smaller than a predetermined distance. Execution of the mitigation control is prevented from being executed, when the distance between the radar-detection target and the image-detection target has increased or decreased monotonically for an interval longer than a predetermined interval.

16 Claims, 4 Drawing Sheets

(51) Int. Cl.
   *G01V 11/00* (2006.01)
   *G01S 13/86* (2006.01)
   *B60W 30/09* (2012.01)
   *B60W 30/095* (2012.01)

(52) U.S. Cl.
   CPC ....... *B60W 30/0956* (2013.01); *G01S 13/867* (2013.01); *G01V 11/00* (2013.01); *G08G 1/16* (2013.01); *G08G 1/163* (2013.01); *G08G 1/166* (2013.01); *G01S 2013/932* (2020.01); *G01S 2013/9325* (2013.01); *G01S 2013/93185* (2020.01)

(56) References Cited

U.S. PATENT DOCUMENTS

| | | | |
|---|---|---|---|
| 2014/0136097 A1 | 5/2014 | Tsuchida | |
| 2014/0343749 A1* | 11/2014 | Minemura | B60W 10/18 701/1 |
| 2015/0203126 A1* | 7/2015 | Kobana | B60K 28/06 701/93 |
| 2017/0307730 A1* | 10/2017 | Baba | G01S 13/931 |
| 2017/0309180 A1 | 10/2017 | Baba | |

FOREIGN PATENT DOCUMENTS

| | | |
|---|---|---|
| JP | 2006-292475 A | 10/2006 |
| JP | 2007-091208 | 4/2007 |
| JP | 2014-099019 | 5/2014 |
| JP | 2016-066182 | 4/2016 |

\* cited by examiner

CASE OF NORMAL DETECTION (b)

CASE OF MONOTONIC DECREASE

FIG.5

OBJECT DETECTION APPARATUS AND OBJECT DETECTION METHOD

CROSS-REFERENCE TO RELATED APPLICATION

This application is the U.S. national phase of International Application No. PCT/JP2016/085931, filed on Dec. 2, 2016, which designated the U.S., and claims the benefit of priority from earlier Japanese Patent Application No. 2015-237667, filed on Dec. 4, 2015, the description of which is incorporated herein by reference.

TECHNICAL FIELD

The present disclosure relates to an apparatus and a method of detecting objects.

BACKGROUND ART

Collision avoidance systems for vehicles need to accurately detect targets such as other vehicles, pedestrians, and the like. To meet the need, a type of apparatus has been proposed for detection of targets. This apparatus uses radar and a camera for the detection of targets. Specifically, an apparatus described in PTL 1 independently detects targets using a millimeter-wave radar apparatus and a stereo camera, and when a positional relationship between these targets satisfies judgement criteria, the targets are determined to be identical with each other.

CITATION LIST

Patent Literature

[PTL 1] JP 2006-292475 A

However, in a situation where a preceding vehicle is passing over a metallic object such as a manhole cover on the surface of the road, and the positional relationship between the preceding vehicle and the manhole cover satisfies the judgement criteria, they may be erroneously determined to be identical with each other. In that case, depending on the positional relationship between the detected metallic object and the own vehicle, a warning may be erroneously given or the automatic brakes may be erroneously applied.

SUMMARY

The present disclosure provides an object detection apparatus and an object detection method that can prevent or reduce erroneous determination that a target detected by a radar apparatus is identical with a target detected by an image capture device if the positional relationship between these targets is a predetermined relationship.

Solution of Problem

In a first aspect of the present disclosure, an object detection apparatus acquires reflection information from a radar apparatus and acquires image information from an image capture device, where the radar apparatus transmits scanning waves ahead of an own vehicle in the travel direction of the own vehicle and receives reflected waves reflected from a target, with the reflection information being based on the reflected waves, and where the image capture device captures an image of a region ahead of the own vehicle in the travel direction of the own vehicle. The object detection apparatus is characterized in that the apparatus comprises: a radar-detection target position detection section detecting a position of a radar-detection target that is a target detected from the reflection information acquired from the radar apparatus; an image-detection target position detection section detecting a position of an image-detection target that is a target detected from the image information acquired from the image capture device; an identical-target determination section determining that the radar-detection target and the image-detection target are identical, when a positional relationship between the radar-detection target and the image-detection target is a predetermined relationship; a collision mitigation section executing mitigation control for mitigating a collision between the own vehicle and the identical target, when the radar-detection target and the image-detection target are determined to be identical by the identical-target determination section and the distance between the own vehicle and the identical target is smaller than a predetermined distance; and an execution prevention section preventing execution of the mitigation control conducted by the collision mitigation section, when the distance between the radar-detection target and the image-detection target has increased monotonically or has decreased monotonically for an interval longer than a predetermined interval.

For example, when a preceding vehicle passes over a metallic object such as a manhole cover on the road, the image capture device may detect the preceding vehicle and the radar apparatus may detect the metallic object. In this situation, if the position of the preceding vehicle detected by the image capture device and the position of the metallic object detected by the radar apparatus have a predetermined relationship, a conventional type of identical-target determination section may determine these targets as being identical. The object detection apparatus of the present disclosure is provided with the execution prevention section, in preparation for such a situation. Even if the radar-detection target and the image-detection target are determined to be identical by the identical target determination section and if the distance between these targets increases or decreases monotonically for an interval longer than a predetermined interval, this implies that the targets apparently have different speeds and thus the targets are not identical. In that case, the collision mitigation section is prevented from executing mitigation control, because the identical-target determination section has a high probability of erroneously making a determination of the targets as being identical. As a result, if the identical-target determination made by the identical-target determination section is in error, the collision mitigation section is prevented from erroneously applying mitigation control.

BRIEF DESCRIPTION OF THE DRAWINGS

The above and other objectives, features or advantageous effects will be made clearer from the following detailed description with reference to the appended drawings.

In the drawings.

DESCRIPTION OF EMBODIMENTS

Figure 1:
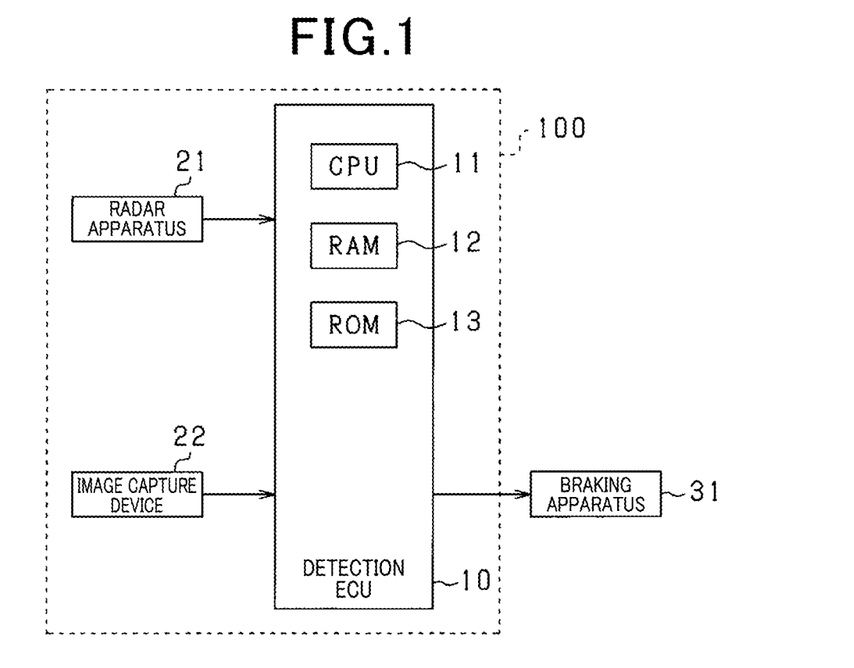
FIG. 1 is a schematic diagram illustrating an object detection apparatus according to the present embodiment.

FIG. 1 shows an object detection apparatus 100 including an ECU (electronic control unit) 10, a radar apparatus 21 and an image capture device 22. The radar apparatus 21 transmits scanning waves ahead in the travel direction of the own vehicle and receives reflected waves from targets. The image capture device 22 captures images of a region ahead in the travel direction of the own vehicle. The object detection apparatus 100 acquires reflection information based on the reflected waves from the radar apparatus 21 and image information from the image capture device 22.

The radar apparatus 21 is a known type of radar apparatus transmitting, for example, millimeter-wave high-frequency signals as transmission waves. The radar apparatus 21 is mounted to a front end part of the own vehicle to detect a target within a detection range defined by predetermined angles. Specifically, the radar apparatus 21 detects the position of a target (hereinafter is referred to as radar-detection target) that is in the detection range. More specifically, the radar apparatus 21 transmits scanning waves ahead of the own vehicle in the travel direction, and receives reflected waves reflected from a detected target by using a plurality of antennas. The radar apparatus 21 calculates the distance to the radar-detection target, based on the transmission time of the scanning waves and the reception time of the reflected waves. The radar apparatus 21 calculates the relative speed of the radar-detection target, based on the frequency change due to Doppler effect in the waves reflected from the detected object. In addition, the radar apparatus 21 calculates the direction of a radar-detection target, based on the phase difference between the reflected waves received by the plurality of antennas. If the distance and direction of a radar-detection target can be calculated, then the relative position of the radar-detection target with respect to the own vehicle can be specified. Hence, the radar apparatus 21 corresponds to an object detection section. At every predetermined interval, the radar apparatus 21 transmits scanning waves and receives the reflected waves, calculates the reflection position and relative speed, and outputs the calculated reflection position and relative speed to the detection ECU 10.

The image capture device 22 includes a CCD (charged-coupled device), a CMOS (complementary metal-oxide semiconductor) image sensor, and a near-infrared camera. In that case, the image capture device 22 is mounted at a predetermined vertical position of the own vehicle that is the center of the own vehicle in the lateral direction to capture a bird's-eye-view image of a region extending with a predetermined angular range ahead of the own vehicle. The image capture device 22 extracts feature points that imply the presence of a target in a captured image (hereinafter is referred to as image-detection target). Specifically, the image capture device 22 extracts edge points, based on the luminance information of a captured image, and applies Hough transform to the extracted edge points. In Hough transform, for example, points of a straight line where a plurality of edge points are continuously arrayed, or points of intersections between straight lines are extracted as feature points. At every predetermined interval, the image capture device 22 captures an image and extracts feature points, and transmits the results of extracting the feature points to the detection ECU 10. The image capture device 22 may be a single-lens camera or a stereo camera.

The detection ECU 10 is connected to the radar apparatus 21 and to the image capture device 22. The detection ECU 10 is a computer including a CPU (central processing unit) 11, a RAM (random access memory) 12, a ROM (read only memory) 13 serving as a non-transitory computer readable medium, and an I/O (input/output) interface. The detection ECU 10 causes the CPU 11 to execute a program installed in the ROM 13 to realize these functions. In the present embodiment, the program installed in the ROM 13 is a program for determining whether a radar-detection target is identical with an image-detection target, based on the information on these targets.

Specifically, the ECU 10, or the CPU 11, detects the position of a radar-detection target that is detected from reflection information acquired from the radar apparatus 21. The detection ECU 10 detects the position of an image-detection target that is detected from image information acquired from the image capture device 22. The detection ECU 10 establishes a correlation between a radar-detection target position that is a position obtained from a radar-detection target and an image-detection target position that is a feature point obtained from an image-detection target. Specifically, if these positions are located close to each other, they are correlated to each other as being based on an identical target. When an image-detection target position is close to a radar-detection target position (in the present embodiment, when the target separation distance between these positions has a predetermined relationship and is within a predetermined range) there is a high probability that there is actually a target at the radar-detection target position. The state where a target position is being accurately acquired by the radar apparatus 21 and the image capture device 22 is referred to as "fusion". If a target is determined to be in a state of fusion, the target is determined to be present at that position (hereinafter, this target is referred to as identical target). The detection ECU 10 corresponds to the radar-detection target position detection section, the image-detection target position detection section, the identical-target determination section, the collision mitigation section, and the execution prevention section.

The own vehicle includes a braking apparatus 31 as a safety device that is driven by a control command from the detection ECU 10

The braking apparatus 31 applies braking to the own vehicle. When the detection ECU 10 determines that the probability of collision with an obstacle is high, the braking apparatus 31 is actuated by a braking command from the detection ECU 10. Specifically, the braking apparatus 31 increases the braking force produced by a brake operation of the driver (braking assistance function), or applies automatic braking when the driver does not operate the brakes. Accordingly, the braking apparatus 31 corresponds to the automatic braking section.

Figure 2:
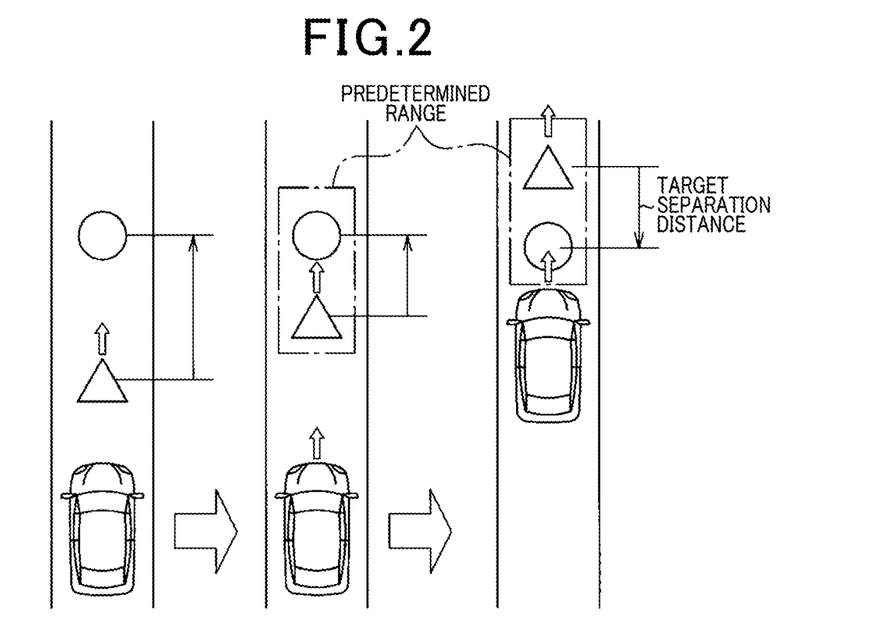
FIG. 2 is a diagram illustrating a situation in which a radar-detection target and an image-detection target are erroneously determined to be identical with each other.

When there is a vehicle preceding the own vehicle which is equipped with the object detection apparatus 100 having the above configuration, and the preceding vehicle passes over a metallic object such as a manhole cover, the image capture device 22 may detect the preceding vehicle and the radar apparatus 21 may detect the manhole cover. Specifically, as shown in FIG. 2, immediately before and after the preceding vehicle (shown by triangle) passes over the metallic object (shown by circle), the position of the preceding vehicle is extremely close to the position of the metallic object. In this situation, the target separation distance between the preceding vehicle detected by the radar apparatus 21 and the metallic object detected by the image capture device 22 is within a predetermined range. Therefore, the detection ECU 10 may erroneously determine that the preceding vehicle and the metallic object are an identical target.

As a countermeasure against this, in the present embodiment, even if the radar-detection target and the image-detection target are determined to be identical, it is determined from this point onward whether there is a large change in the position of the radar-detection target and the position of the image-detection target.

Specifically, for an interval longer than a predetermined interval from the point of determining the targets as being identical (identical-target determination), it is determined whether the target separation distance between the radar-detection target and the image-detection target has increased or decreased monotonically. Alternatively, during an interval from the point of the identical-target determination until lapse of a determination time, it is determined whether the target separation distance between the radar-detection target and the image-detection target has increased beyond a range of an error that is assumed to occur when making the identical-target determination. The error range is made shorter than a predetermined range that has been set for determining whether the radar-detection target and the image-detection target are identical. If at least one of these two determinations results in that there is a probability that the radar-detection target and the image-detection target are not identical, the detection ECU 10 does not issue a command for executing automatic braking with the braking apparatus 31. Such a determination is made, specifically, as mentioned above, when the target separation distance between the radar-detection target and the image-detection target has increased or decreased monotonically for an interval longer than a predetermined interval from the point of the identical-target determination, or when the target separation distance between the radar-detection target and the image-detection target has increased beyond the error range during an interval from the point of the identical-target determination until lapse of a determination time. Thus, when there is an error in the identical-target determination, the braking apparatus 31 is prevented from applying erroneous braking.

Figure 3:
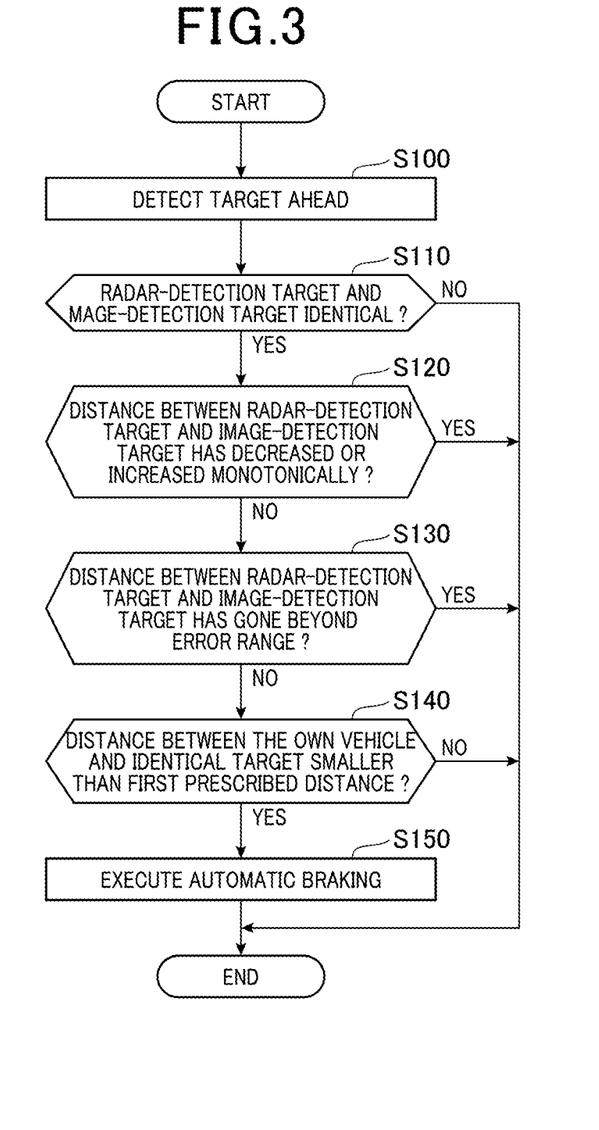
FIG. 3 is a flow diagram illustrating control executed by the object detection apparatus according to the present embodiment.

In the present embodiment, object detection control shown in FIG. 3 is executed by the detection ECU 10 (i.e. CPU 11) as described below. The object detection control shown in FIG. 3 is cyclically executed while electric power is applied to the detection ECU 10.

Firstly, at step S100, a target ahead of the own vehicle is detected by the radar apparatus 21 and the image capture device 22. Then, at step S110, the detection ECU 10 determines whether the image-detection target detected by the image capture device 22 and the radar-detection target detected by the radar apparatus 21 are identical. The determination as to whether the targets are identical corresponds to the determination, as described above, as to whether the target separation distance between the radar-detection target and the image-detection target is within a predetermined range for establishing a predetermined relationship therebetween. If the radar-detection target and the image-detection target are determined not to be identical (NO at step S110), the present processing is terminated. If the radar-detection target and the image-detection target are determined to be identical (YES at step S110), control proceeds to step S120.

Figure 4:
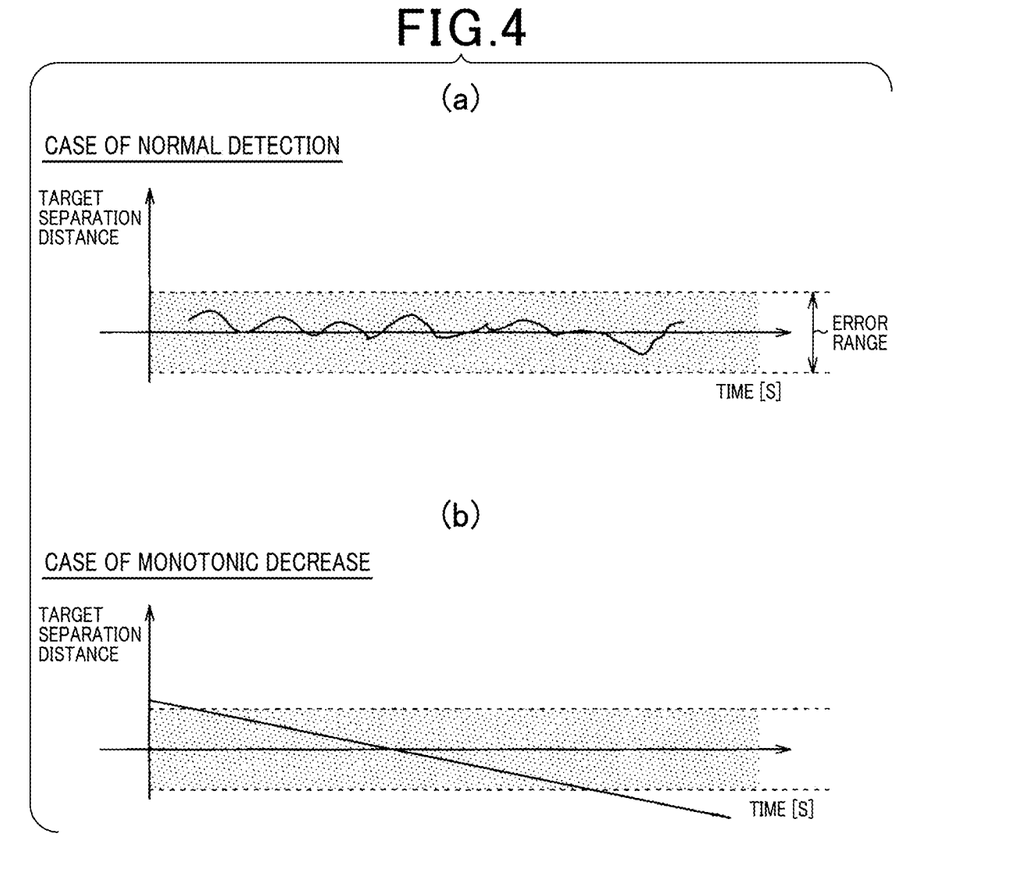
FIG. 4 is a set of diagrams, with (a) illustrating an example of time-varying target separation distance when the identical-target determination is correct, and with (b) illustrating an example of time-varying target separation distance when the identical-target determination is in error.

At step S120, for an interval longer than a predetermined interval from the point of the identical-target determination, it is determined whether the target separation distance between the radar-detection target and the image-detection target has increased or decreased monotonically. If the target separation distance between the radar-detection target and the image-detection target increases or decreases monotonically for an interval longer than a predetermined interval from the point of the identical-target determination (YES at S120), the present control is terminated. For example, let us assume a situation, as shown in FIG. 4(*b*), where the target separation distance between the radar-detection target and the image-detection target increases with time in a negative direction (monotonic decrease). It is implied in this situation that the targets are not identical because the speeds of the targets are apparently different from each other. If the target separation distance between the radar-detection target and the image-detection target does not increase or decrease monotonically for an interval longer than a predetermined interval from the point of the identical-target determination (NO in step S120), control proceeds to step S130. The reason for this is that, as shown in FIG. 4(*a*), for example, even if the target separation distance between the radar-detection target and the image-detection target repeatedly increases and decreases, so long as the increase or decrease does not continue for an interval longer than a predetermined interval, the increase or decrease is understood to be an error that would occur when making the identical-target determination.

At step S130, it is determined whether the target separation distance between the radar-detection target and the image-detection target has exceeded the error range during an interval from the point of determining these targets as being identical until lapse of a determination time. If the target separation distance has exceeded the error range during an interval from the point of the identical-target determination until lapse of a determination time (YES 15 S130), the present control is terminated. The reason for this is that there is so large a variance in the target separation distance that it is difficult to confirm that the state is fusion. If the target separation distance between the radar-detection target and the image-detection target is within the error range during an interval from the point of the identical-target determination until lapse of a determination time (NO at step S130), control proceeds to step S140.

At step S140 it is determined whether the distance between the own vehicle and the identical target is smaller than a first predetermined distance set in advance. If it is determined that the distance between the own vehicle and the identical target is larger than the first predetermined distance (NO at S140), the present control is terminated. If the distance between the own vehicle and the identical target is smaller than the first predetermined distance (YES at S134), control proceeds to step S150 to cause the braking apparatus 31 to apply automatic braking. Then, the present control is terminated.

If it is determined at step S120 or S130 that there is a high probability of the image-detection target and the radar-detection target not being identical (YES at S120 or S130) in a state where the distance between these targets is smaller than the first predetermined distance, the present control is terminated without issuance of a command for executing automatic braking with the braking apparatus 31. If automatic braking has already been applied by the braking apparatus 31, execution of automatic braking with the braking apparatus 31 is halted.

The present embodiment having the above configuration may accomplish the following advantageous effects.

Let us assume a situation where the radar-detection target and the image-detection target are determined to be identical, but the target separation distance therebetween increases or decreases monotonically for an interval longer than a predetermined interval. In that case, even if the distance between the own vehicle and the identical target is smaller than the first predetermined distance, the detection ECU 10 does not issue a command for executing automatic braking with the braking apparatus 31. Thus, if the identical-target determination is in error, the braking apparatus 31 is prevented from erroneously applying automatic braking.

Let us assume now a situation where, during the interval from the point of making an identical-target determination until lapse of a determination time, the target separation distance between the radar-detection target and the image-detection target has exceeded the error range. In that case, since there is a high probability that the radar-detection target and the image-detection target are not identical, no command for executing automatic braking with the braking apparatus 31 is issued. Thus, in this situation as well, the braking apparatus 31 is prevented from erroneously applying automatic braking if the identical-target determination is in error.

The following modifications may be made to the above embodiment.

In the above embodiment, if it is determined that the radar-detection target and the image-detection target have a high probability of not being identical, no command for executing automatic braking with the braking apparatus 31 is issued by the detection ECU 10. In that regard, the present disclosure is not limited to omitting the issuance of a command for executing automatic braking with the braking apparatus 31. For example, it may be so configured that the detection ECU 10 controls the braking apparatus 31 so as to delay the time of automatic braking.

The above embodiment adopts measures to mitigate collision with a target (collision mitigation means) according to the distance between the own vehicle and the identical target. Specifically, if the distance between the own vehicle and the identical target is smaller than the first predetermined distance, the detection ECU 10 causes the braking apparatus 31 to apply automatic braking. However, the collision mitigation means is not necessarily limited to automatic braking control for the braking apparatus 31. For example, besides the braking apparatus 31, a warning apparatus (corresponding to the notifying section) may be provided to notify the driver of the approach of an object ahead of the own vehicle. An example of object detection control in such a case will be described.

Figure 5:
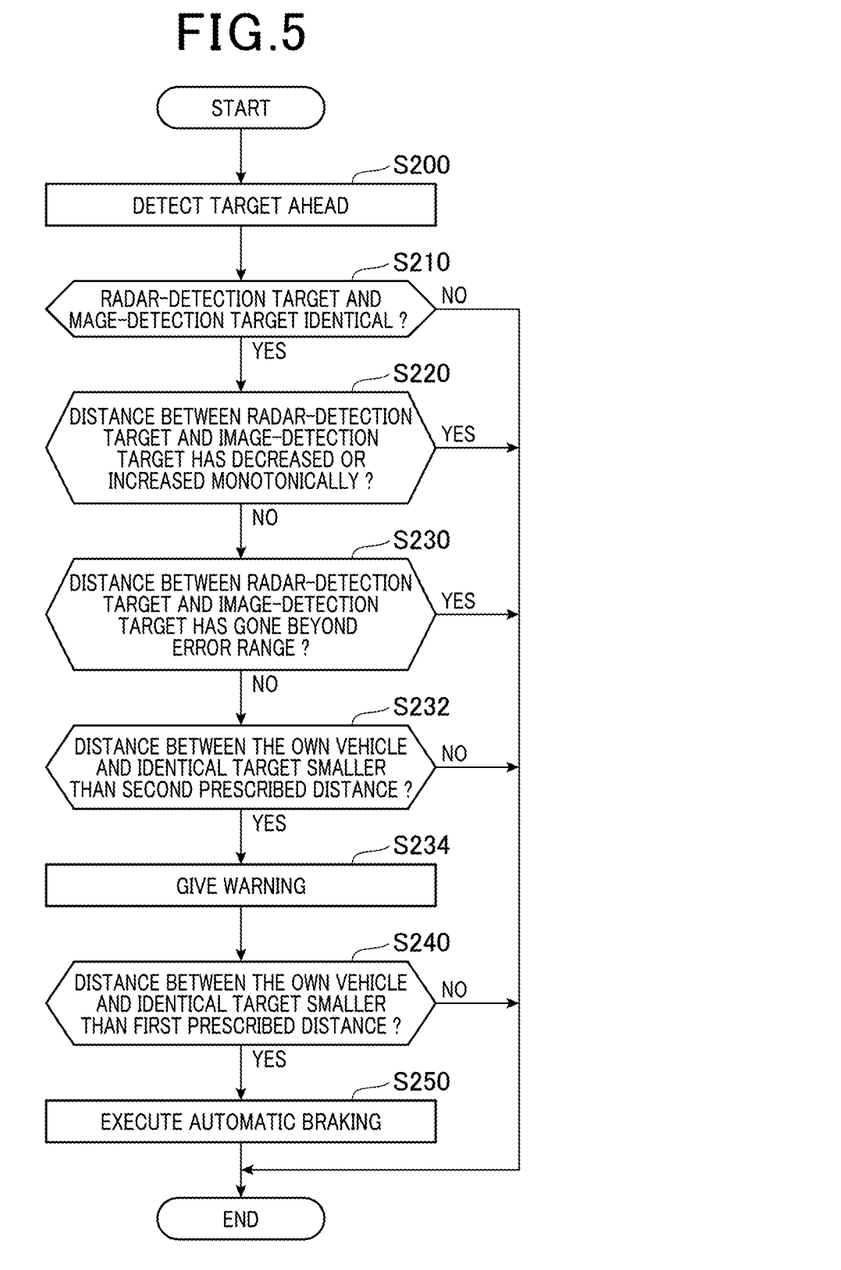
FIG. 5 is a flow diagram illustrating control executed by an object detection apparatus according to another embodiment.

FIG. 5 is a flow diagram illustrating control executed by an object detection apparatus according to another embodiment. FIG. 5 is a partial modification of the flow diagram of FIG. 3. That is to say, in the embodiment shown in FIG. 5, steps S232 and S234 are added between step S230 corresponding to step S130 of FIG. 3 and step S240 corresponding to step S140 of FIG. 3. At step S232, the detection ECU 10 determines whether the distance between the own vehicle and the identical target is smaller than a second predetermined distance that is larger than the first predetermined distance. If the distance between the own vehicle and the identical target is determined to be larger than the second predetermined distance (NO at S232), the present control is terminated. If the distance between the own vehicle and the identical target is determined to be smaller than the second predetermined distance (YES at S234), control proceeds to step S234 where the warning apparatus is commanded to generate a warning for advising the driver of the approach of a target ahead of the own vehicle.

Other steps S200, 210, 220 and 250 of FIG. 5 are respectively the same as steps S100, 110, 120 and 150 of FIG. 3.

In this way, the driver is notified of the presence of a target ahead of the own vehicle before the braking apparatus 31 is permitted to apply automatic braking. Thus, the driver is prompted to perform a collision avoidance operation. Further, the frequency of applying automatic braking with the braking apparatus 31 can be reduced.

In the above embodiment, when the distance between the own vehicle and the identical target is smaller than the first predetermined distance, automatic braking is applied by the braking apparatus 31. However, the present control does not need to necessarily include collision mitigation control, such as automatic braking applied by the braking apparatus 31. In such a case, if it is determined at step S120 or S130 of FIG. 3 that there is a high probability of the radar-detection target and the image-detection target being not identical, following the determination of these targets as being identical, then the detection ECU 10 cancels the identical-target determination. Further, as shown at step S140 of FIG. 3, if it is determined that the distance between the radar-detection target and the image-detection target has exceeded the error range during an interval from the point of the determination of these targets as being identical until lapse of a determination time, then the detection ECU 10 cancels the identical-target determination. Thus, irrespective of the radar-detection target and the image-detection target being different from each other, the probability of erroneously determining these targets as being identical can be prevented or reduced. The detection ECU 10 of the present embodiment corresponds to the determination cancellation section.

The present disclosure has been described based on embodiments, however it should be understood that the present disclosure is not limited to these embodiments and configurations. The scope of the present disclosure should encompass various modifications or equivalents. Further, various combinations or modes, or other combinations or modes constituted by one or more elements of the various combinations or modes are included within the category or idea of the present disclosure.

PARTIAL REFERENCE SIGNS LIST

10 . . . Detection ECU 21 . . . Radar apparatus 22 . . . Image capture device 100 . . . Object detection apparatus

The invention claimed is:

1. An object detection apparatus configured to acquire reflection information and image information, and
the object detection apparatus comprising a control system including a computer hardware processor executing instructions, wherein the instructions are configured to cause performance of operations comprising:
detecting a position of a radar detection target that is a target detected from the reflection information acquired from a radar apparatus that transmits scanning waves ahead of a vehicle in a travel direction of the vehicle and that receives reflected waves reflected from a target, with the reflection information being based on the reflected waves;

detecting a position of an image detection target that is a target detected from the image information acquired from an image capture device that captures an image of a region ahead of the vehicle in the travel direction of the vehicle;

determining whether the radar-detection target and the image-detection target are identical determining that the radar-detection target and image-detection target are identical in response to a predetermined relationship, which includes a positional relationship between the radar target and the image-detection target, being satisfied;

determining a distance between the vehicle and the identical target;

executing mitigation control for mitigating a collision between the vehicle and the identical target in response to determining that the radar-detection target and the image detection target are identical and the distance between t the vehicle and the identical target is smaller than a predetermined distance;

determining whether or not a state is obtained in which the distance between the radar-detection target and the image-detection target has increased or decreased monotonically from a time interval longer than a predetermined time interval, the time interval being from when the radar-detection target and the image-detection target are first determined as being identical; and preventing execution of the mitigation control in response to determining that the state is obtained.

2. The object detection apparatus according to claim 1, wherein the operations further comprise halting execution of the collision mitigation control when the distance between the radar-detection target and the image-detection target has exceeded an error range during an interval which is designated from a point in which it is determined that the radar-detection target and the image-detection target are identical until a determination time has lapsed.

3. The object detection apparatus according to claim 2, wherein the vehicle includes an automatic braking section configured to apply automatic braking to the vehicle.

4. The object detection apparatus according to claim 3, wherein:
the vehicle includes a notification section which notifies a driver of an approach of an object as being a target; and
execution of the notification is performed prior to performance of the automatic braking of the vehicle as executed by the automatic braking section.

5. The object detection apparatus according to claim 4, wherein the positional relationship corresponds to the distance between the radar-detection target and the image detection target being within a predetermined range.

6. The object detection apparatus according to claim 2, wherein the positional relationship corresponds to the distance between the radar-detection target and the image detection target being within a predetermined range.

7. The object detection apparatus according to claim 1, wherein the vehicle includes an automatic braking section configured to apply automatic braking to the vehicle.

8. The object detection apparatus according to claim 7, wherein: the vehicle includes a notification section configured to notify a driver of an approach of an object as being the target; and
execution of the notification is performed prior to performance of the automatic braking of the vehicle as executed by the automatic braking section.

9. The object detection apparatus according to claim 8, wherein the positional relationship corresponds to the distance between the radar-detection target and the image detection target being within a predetermined range.

10. The object detection apparatus according to claim 7, wherein the positional relationship corresponds to the distance between the radar-detection target and the image detection target being within a predetermined range.

11. The object detection apparatus according to claim 1, wherein the positional relationship corresponds to the distance between the radar-detection target and the image-detection target being within a predetermined range.

12. An object detection apparatus configured to acquire reflection information and image information, the object detection apparatus comprising a control system including a computer hardware processor configured to execute instructions, wherein the instructions are configured to cause performance of operations comprising:

detecting a position of a radar detection target that is a target detected from the reflection information acquired from a radar apparatus that transmits scanning waves ahead of a vehicle in a travel direction of the vehicle and that receives reflected waves reflected from a target, with the reflection information being based on the reflected waves;

detecting a position of an image detection target that is a target detected from image information acquired from an image capture device that captures an image of a region ahead of the vehicle in the travel direction of the vehicle;

determining whether the radar-detection target and the image-detection target are identical determining that the radar-detection target and image-detection target are identical in response to a predetermined relationship, which is a positional relationship between the radar target and the image-detection target, being satisfied;

determining a distance between the vehicle and the identical target;

determining whether or not a state is obtained in which the distance between the radar-detection target and the image-detection target has increased or decreased monotonically from a time interval longer than a predetermined time interval, the time interval being from when the radar-detection target and the image-detection target are first determined as being identical; and cancelling the identical target determination in response to determining that the state is obtained.

13. The object detection apparatus according to claim 12, wherein the operations further comprise cancelling the determination of the radar-detection target and the image-detection target as being identical in response to the distance between the radar-detection target and the image detection target exceeding an error range during an interval designated from a point in which the identical target is determined , until a determination time has lapsed.

14. An object detection method of acquiring reflection information and image information, the object detection method comprising:

a radar-detection target position detection step of detecting a position of a radar-detection target that is a target detected from the reflection information acquired from a radar apparatus that transmits scanning waves ahead of a vehicle in a travelling direction of the vehicle and that receives reflected waves reflected from a target, the reflection information being based on the reflected waves;

an image-detection target position detection step of detecting a position of an image detection target that is a target detected from the image information acquired from an image capture device that captures an image of a region ahead of the vehicle in a travel direction of the vehicle;

an identical-target determination step of determining whether, the radar-detection target and the image-detection target are identical;

determining that the radar-detection target and image-detection target are identical in response to a predetermined relationship, which is a positional relationship between the radar target and the image-detection target, being satisfied;

a distance determination step of determining a distance between the vehicle and the identical target;

a collision mitigation step of executing mitigation control for mitigating a collision between the vehicle and the identical target, in response to the identical-target determination step determining that the radar-detection target and the image detection target are identical and the distance between vehicle and the identical target being smaller than a predetermined distance;

a state determination step of determining whether or not a state is obtained in which the distance between the radar-detection target and the image-detection target has increased or decreased monotonically from a time interval longer than a predetermined time interval, the time interval being from when the radar-detection target and the image-detection target are first determined as being identical; and an execution prevention step of preventing execution of the mitigation control in response to determining that the state is obtained.

15. The object detection method according to claim 14, wherein the collision mitigation step halts execution of the collision mitigation control when the distance between the radar-detection target and the image-detection target has exceeded an error range during an interval designated from a point at which the identical-target determination step determines the radar-detection target and the image-detection target as being identical until a determination time has elapsed.

16. An object detection system for a vehicle, the system comprising:

a radar apparatus configured to transmit scanning waves ahead of the vehicle in the travel direction of the vehicle and receive reflected waves reflected from a target;

an image capture device configured to capture an image of a region ahead of the vehicle in a travel direction of the vehicle, and an object detection apparatus configured to acquire reflection information and image information, the object detection apparatus comprising a control system including a computer hardware processor configured to execute instructions, wherein the instructions are configured to cause performance of operations comprising:

detecting a position of a radar detection target that is a target detected from reflection information acquired from the radar apparatus, the reflection information being based on the reflected waves;

detecting a position of an image detection target that is a target detected from image information acquired from the image capture device;

determining whether the radar-detection target and the image-detection target are identical;

determining that the radar-detection target and image-detection target are identical in response to a predetermined relationship, which is a positional relationship between the radar target and the image-detection target, being satisfied;

determining a distance between the vehicle and the identical target;

executing mitigation control for mitigating a collision between the vehicle and the identical target, in response to determining that the radar-detection target and the image detection target are identical and the distance between the vehicle and the identical target is smaller than a predetermined distance;

determining whether or not a state is obtained in which the distance between the radar-detection target and the image-detection target has increased or decreased monotonically from a time interval longer than a predetermined time interval, the time interval being from when the radar-detection target and the image-detection target are first determined as being identical; and preventing execution of the mitigation control in response to determining that the state is obtained.

* * * * *